(12) United States Patent
Papp

(10) Patent No.: US 6,819,249 B1
(45) Date of Patent: Nov. 16, 2004

(54) CHILD SEAT FOR MONITORING THE PRESENCE OF A CHILD

(76) Inventor: Anne Papp, 12501 Crossburn Ave., Cleveland, OH (US) 44135

( * ) Notice: Subject to any disclaimer, the term of this patent is extended or adjusted under 35 U.S.C. 154(b) by 0 days.

(21) Appl. No.: 10/301,264

(22) Filed: Nov. 22, 2002

(51) Int. Cl.[7] .............................................. G08B 23/00
(52) U.S. Cl. .................... 340/573.1; 340/666; 340/667; 307/9.1; 307/10.1
(58) Field of Search .............................. 340/573.1, 438, 340/541, 540, 428, 425.5, 426, 666, 667; 307/9.1, 10.1

(56) References Cited

U.S. PATENT DOCUMENTS

| | | | |
|---|---|---|---|
| 5,260,684 A | | 11/1993 | Metzmaker |
| 5,680,096 A | | 10/1997 | Grasmann |
| 5,745,030 A | * | 4/1998 | Aaron ................... 340/426.11 |
| 5,793,291 A | * | 8/1998 | Thornton ................. 340/573.1 |
| D411,375 S | | 6/1999 | Onishi et al. |
| 5,949,340 A | | 9/1999 | Rossi |
| 6,028,509 A | | 2/2000 | Rice |
| 6,104,293 A | * | 8/2000 | Rossi ...................... 340/573.1 |
| 6,222,442 B1 | * | 4/2001 | Gager et al. ........... 340/426.29 |
| 6,353,383 B1 | * | 3/2002 | Gross et al. ............. 340/425.5 |
| 6,546,822 B1 | * | 4/2003 | Tahara et al. ............ 73/862.41 |

* cited by examiner

*Primary Examiner*—Jeffery Hofsass
*Assistant Examiner*—Eric Blount

(57) ABSTRACT

A child detection system includes a warning system for detecting the presence of a child in a vehicle. The vehicle has a front seat area, a rear seat area, and an interior. The system comprises a plurality of pressure sensors each removably positioned selectively under one or both of the front and rear seat areas such that pressure on one of the seat areas actuates an associated one of the pressure sensors. A control is electrically coupled to an electrical power supply and is electrically coupled to each of the pressure sensors. The control is selectively coupled to the electric system of the vehicle such that the processor may detect when the vehicle is turned off. An alarm is operationally coupled to the control and emits an audible sound when any of the pressure sensors sense pressure. The control is turned on when the vehicle is turned off.

4 Claims, 3 Drawing Sheets

CHILD SEAT FOR MONITORING THE PRESENCE OF A CHILD

BACKGROUND OF THE INVENTION

1. Field of the Invention

The present invention relates to warning systems and more particularly pertains to a new warning system for fulfilling the need for an electronic reminder system that would help prevent parents from leaving children in vehicles unattended.

2. Description of the Prior Art

The use of warning systems is known in the prior art. U.S. Pat. No. 5,793,291 describes a child alert system for automobiles for detecting the presence of a person locked in a parked automobile. Another type of warning system is U.S. Pat. No. 5,949,340 describing a warning system for detecting presence of a child in an infant seat. U.S. Pat. No. 5,680,096 describes a process and apparatus for monitoring a vehicle interior. U.S. Pat. No. 6,028,509 describes a voice activated vehicle alarm system for the interior of a vehicle utilizing a temperature sensor measuring the interior temperature of a vehicle and producing a signal when a certain level of temperature is reached. U.S. Pat. No. Des. 411,375 describes an ornamental design for a combined child bed and safety seat for an automobile. U.S. Pat. No. 5,260,684 describes a warning system for a child's restraining seat for use in a passenger vehicle.

While these devices fulfill their respective, particular objectives and requirements, the need remains for a system that integrates with an existing vehicles security system for alerting you that your child is in the back seat of the vehicle.

SUMMARY OF THE INVENTION

The present invention meets the needs presented above by integrating with an existing vehicles electrical and security systems.

Another object of the present invention is to provide a new warning system that would remind parents to always take their children with them, so as to prevent heat stroke, potential abductions, and children working the vehicle controls that might otherwise cause accidents.

Still another object of the present invention is to provide a new warning system that would utilize dual sensors and detectors to prevent false triggering.

To this end, the present invention generally comprises a warning system for detecting the presence of a child in a vehicle. The vehicle has a front seat area, a rear seat area, and an interior. The vehicle has an electronics system. The system comprises a plurality of pressure sensors each removably positioned selectively under one or both of the front and rear seat areas such that pressure on one of the seat areas actuates an associated one of the pressure sensors. A control is electrically coupled to an electrical power supply and is electrically coupled to each of the pressure sensors. The control is selectively coupled to the electric system of the vehicle such that the processor may detect when the vehicle is turned off. An alarm is operationally coupled to the control and emits an audible sound when any of the pressure sensors sense pressure. The control is turned on when the vehicle is turned off.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
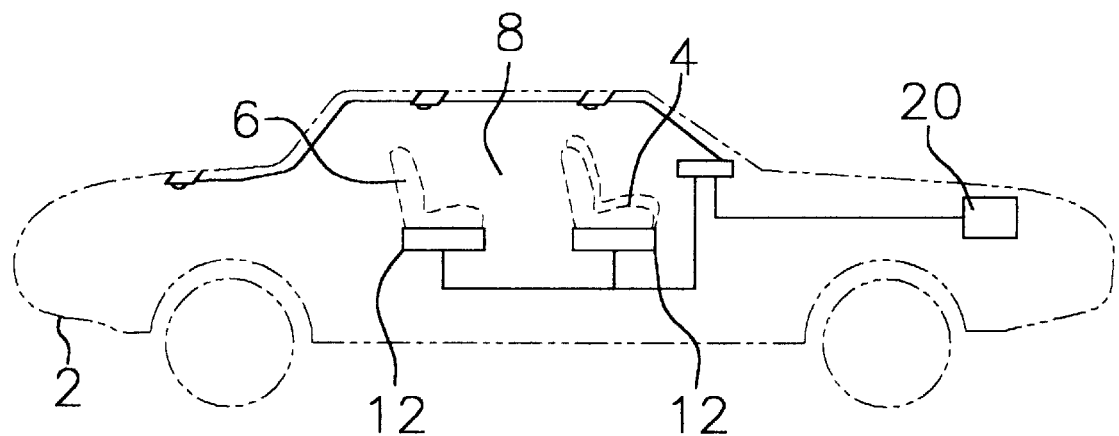
FIG. 1 is a side view of a child detection system according to the present invention.
Figure 2:
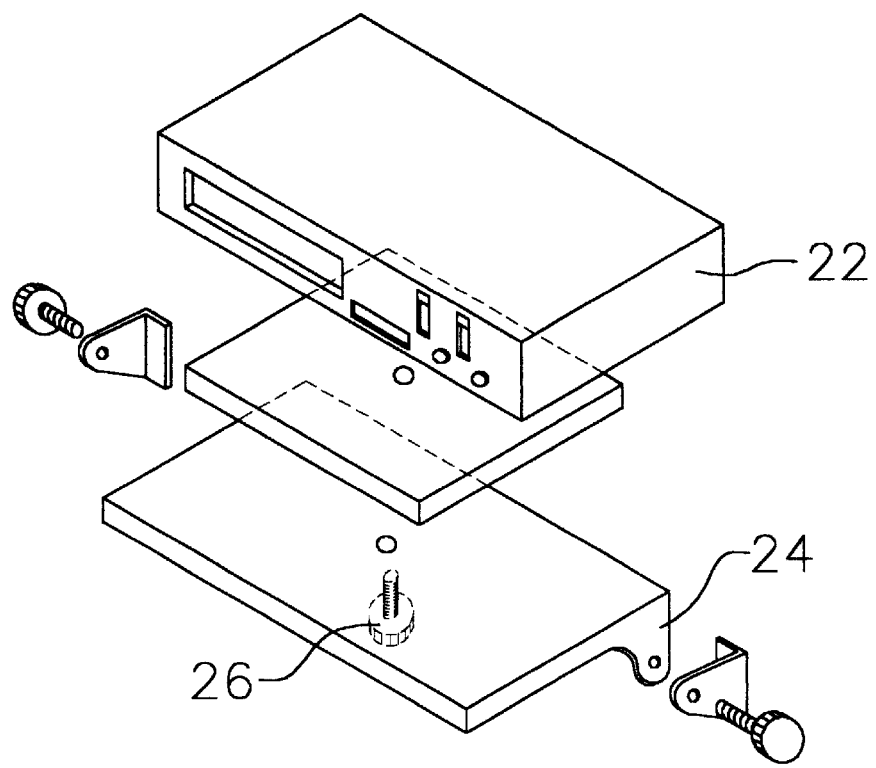
FIG. 2 is a perspective view of the present invention.

With reference now to the drawings, and in particular to FIGS. 1 through 4 thereof, a new warning systems embodying the principles and concepts of the present invention and generally designated by the reference numeral 10 will be described.

Figure 3:
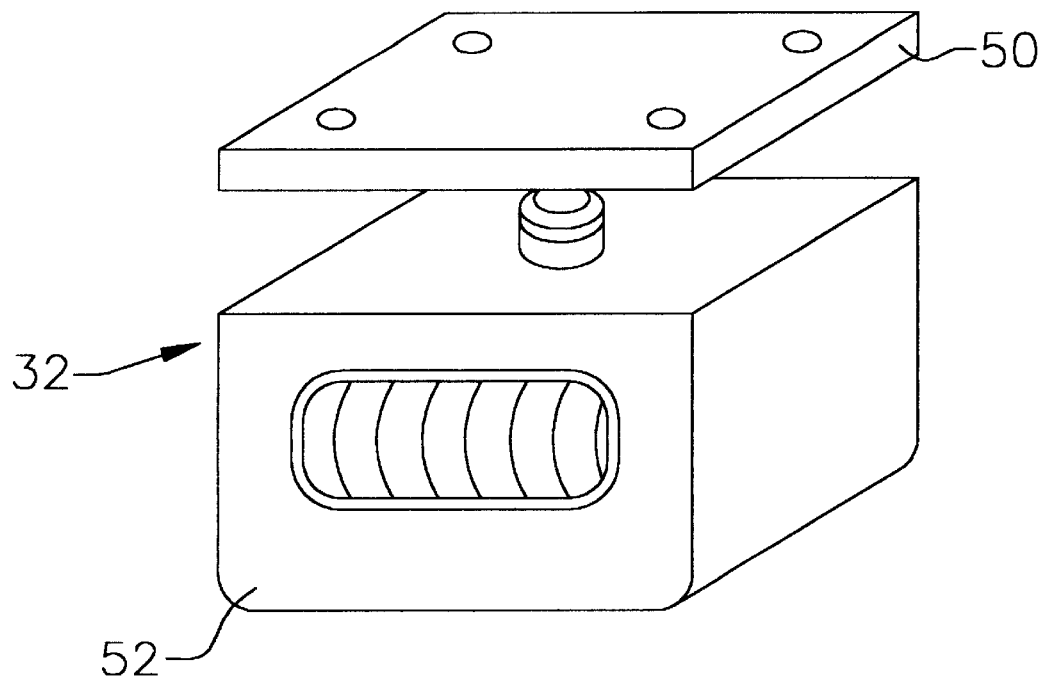
FIG. 3 is a perspective view of the present invention.
Figure 4:
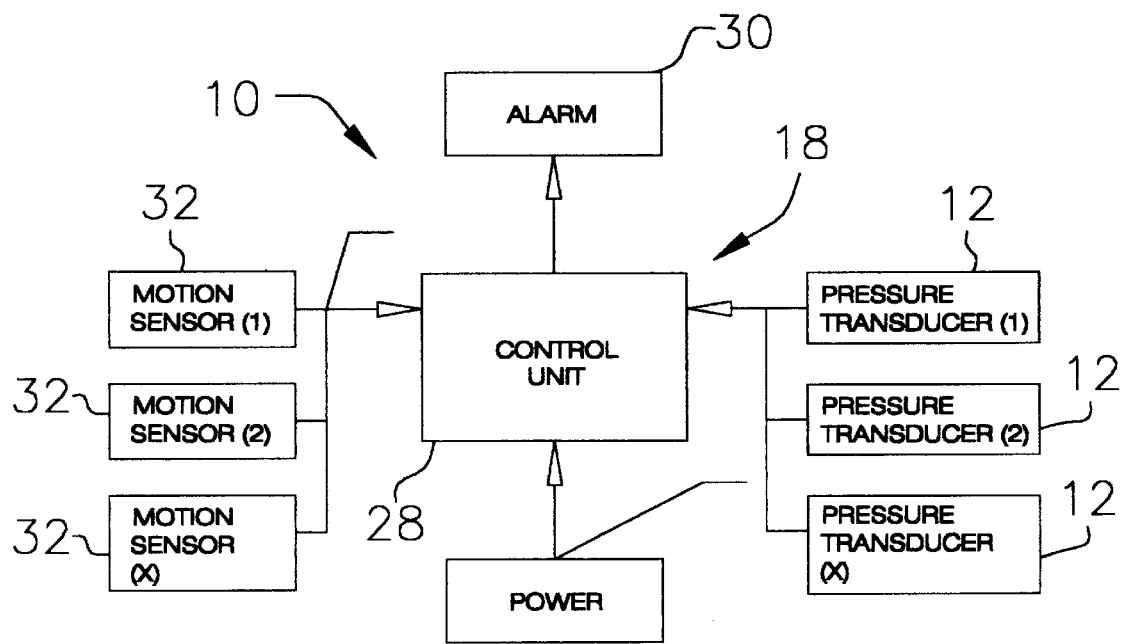
FIG. 4 is a block diagram view of the present invention.
Figure 5:
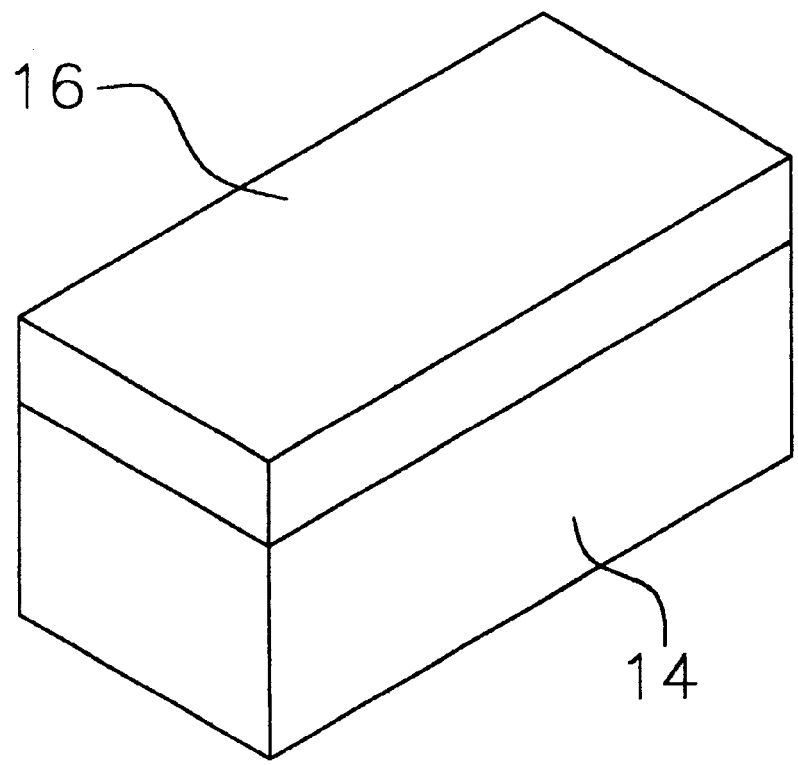
FIG. 5 is an enlarged view of a pressure sensor of the present invention.

As best illustrated in FIGS. 1 through 4, child detection system 10 generally comprises a system for detecting the presence of a child in a vehicle 2. The vehicle 2 is conventional and has a front seat area 4, a rear seat area 6, and an interior 8. The vehicle 2 also has an electric system for monitoring the drive train and gears associated therewith as well as whether or not the vehicle 2 is turned on or off. The system 10 includes a plurality of pressure sensors 12. Each of the pressure sensors 12 is removably positioned selectively under one or both of the front 4 and rear seat 6 areas such that pressure on one of the seat areas actuates an associated one of the pressure sensors 12. FIG. 3 is illustrative of an example pressure sensor 12 having a base 14 and an actuator 16 mounted on the base 14. When positioned under the front 4 or rear 6 seat areas or under a child safety chair, the actuator 16 is moved downward when pressure from a child's weight is disposed thereon.

A control 18 is electrically coupled to an electrical power supply 20. The electrical power supply 20 is preferably the vehicle power supply, though the control 18 could have its own battery power supply. The control 18 is electrically coupled to each of the pressure sensors 12. The control 18 comprises a housing 22, which is preferably mounted to a plate 24 by means of a swivel 26. The plate 24 may then be attached to an interior 8 of the vehicle 2. A processor 28 is mounted in the housing 22 and is adapted for receiving and sending electrical signals. Each of the pressure sensors 12 is operationally coupled to the processor 28 such that the pressure sensors 12 send an electric signal to the processor 28 when the pressure sensors 12 detect pressure. The processor 28 is selectively coupled to the electric system of the vehicle 2 such that the processor 28 may detect when the vehicle 2 is turned off. A plurality actuators 16 is mounted on the housing 22 and is operationally coupled to the processor 28 for selectively turning the processor 28 on or off. The actuators 16 may include a numerical keypad for entering a code for turning the processor 28 on or off.

An alarm 30 is operationally coupled to the control 18. The alarm 30 emits an audible sound when any of the pressure sensors 12 sense a pressure. The alarm 30 comprises a speaker for producing an audible sound. Preferably, the speaker is mounted in the housing and is operationally coupled to the processor 28.

Preferably, a plurality of motion detectors 32 is operationally coupled to the control 18. The control 18 actuates the alarm 30 when movement actuates any of the motion detectors 32. The plurality of motion detectors 32 is removably mounted in the interior 8 of the vehicle 2 and act as a back up system to the pressure sensors 12. The motion detectors 32 include a mounting plate 50 and a detector 52 pivotally coupled to the mounting plate.

In use, the device 10 is retrofitted to the vehicle 2 or installed during assembly. The control 18 is turned on when the vehicle 2 is turned off, or, alternatively, the control 18 may be turned on when the vehicle 2 is put in park. If a child is sitting on a pressure sensor 12, or is detected by the motion detectors 32, the sensor sends a signal to the processor 28, which in turn actuates the alarm 30. The alarm 30 signals the driver of the vehicle 2 that a child is in the vehicle to ensure that the child is not forgotten and left within the vehicle 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A warning system for detecting the presence of a child in a vehicle, the vehicle having a front seat area, a rear seat area, and an interior, the vehicle having an electric system, said system comprising:
   a plurality of pressure sensors, each of said pressure sensors being removably positioned selectively under one or both of the front and rear seat areas such that pressure on one of the seat areas actuates an associated one of said pressure sensors;
   a control being electrically coupled to an electrical power supply, said control being electrically coupled to each of said pressure sensors, said control comprising;
      a housing;
      a processor being mounted in said housing and being adapted for receiving and sending electrical signals, wherein each of said pressure sensors are operationally coupled to said processor such that said pressure sensors send an electric signal to said processor when said pressure sensors detect pressure, said processor being selectively coupled to the electric system of the vehicle such that said processor may detect when the vehicle is turned off;
      a plurality of actuators being mounted on said housing and being operationally coupled to said processor, said plurality of actuators including a keypad for selectively entering a code for turning said processor on or off;
      an alarm being operationally coupled to said control, wherein said alarm emits an audible sound when any of said pressure sensors sense a pressure, said alarm comprising a speaker for producing an audible sound, said speaker being mounted in said housing and being operationally coupled to said processor;
      a plurality of motion detectors being operationally coupled to said control, wherein said control actuates said alarm when any of said motion detectors is actuated by movement, said plurality of motion detectors being removably mounted in the interior of the vehicle and being adopted for detecting motion therein; and
   wherein said control is turned on when the vehicle is turned off.

2. A method of detecting and warning of a presence of a person within a vehicle, said method comprising the steps of:
   providing a vehicle having a front seat area, a rear seat area, and an interior, the vehicle having an electric system;
   providing a plurality of pressure sensors, each of said pressure sensors being removably positioned selectively under each one of the front and rear seat areas such that pressure on one of the seat areas actuates an associated one of said pressure sensors;
   providing a control being electrically coupled to an electrical power supply of said vehicle, said control being electrically coupled to each of said pressure sensors, said control comprising;
      a housing;
      a processor being mounted in said housing and being adapted for receiving and sending electrical signals, wherein each of said pressure sensors are operationally coupled to said processor such that said pressure sensors send an electric signal to said processor when said pressure sensors detect pressure, said processor being selectively coupled to the electric system of said vehicle and being adopted for detecting when said vehicle is turned off;
      a plurality actuators being mounted on said housing and being operationally coupled to said processor;
   providing an alarm being operationally coupled to said control, wherein said alarm emits an audible sound when any of said pressure sensors sense a pressure, said alarm comprising a speaker for producing an audible sound, said speaker being mounted in said housing and being operationally coupled to said processor;
   a plurality of motion detectors being operationally coupled to said control, each of said motion detectors being mounted within said vehicle and being adopted for detecting motion within said vehicle; and
   turning on said motion detectors and said pressure sensors by said processor when said vehicle is turned off;
   leaving a child within said vehicle after said vehicle has been turned off; and
   sounding said alarm by said processor when the child creates pressure that is detected by said pressure sensors or when the child creates motion that is detected by said motion detectors.

3. A warning system for detecting the presence of a child in a vehicle, the vehicle having a front seat area, a rear seat area, and an interior, the vehicle having an electric system, said system comprising:
   a plurality of pressure sensors, each of said pressure sensors being removably positioned selectively under one or both of the front and rear seat areas such that pressure on one of the seat areas actuates an associated one of said pressure sensors;

a control being electrically coupled to an electrical power supply, said control being electrically coupled to each of said pressure sensors, said control comprising;

a housing;

a processor being mounted in said housing and being adapted for receiving and sending electrical signals, wherein each of said pressure sensors are operationally coupled to said processor such that said pressure sensors send an electric signal to said processor when said pressure sensors detect pressure, said processor being selectively coupled to the electric system of the vehicle such that said processor may detect when the vehicle is placed in park;

an alarm being operationally coupled to said control, wherein said alarm emits an audible sound when any of said pressure sensors sense a pressure, said alarm comprising a speaker for producing an audible sound, said speaker being mounted in said housing and being operationally coupled to said processor; and wherein said control turns on said pressure sensors when the vehicle is placed in park.

4. The system according to claim 3, further including a plurality of motion detectors being operationally coupled to said control, wherein said control actuates said alarm when any of said motion detectors is actuated by movement, said plurality of motion detectors being removably mounted in the interior of the vehicle and being adopted for detecting motion therein, wherein said control turns on said motion detectors when the vehicle is placed in park and said alarm emits an audible sound when any of said motion detectors detects motion within the vehicle.

* * * * *